United States Patent
Nakagawa et al.

(10) Patent No.: US 6,666,013 B2
(45) Date of Patent: Dec. 23, 2003

(54) WEAR RESISTANT CHAIN

(75) Inventors: Takerou Nakagawa, Osaka (JP); Shigeo Tamura, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/382,685

(22) Filed: Mar. 6, 2003

(65) Prior Publication Data

US 2003/0177752 A1 Sep. 25, 2003

(30) Foreign Application Priority Data

Mar. 19, 2002 (JP) ........................... 2002-076689

(51) Int. Cl.[7] ................ F16G 13/08; C25D 5/34; C22C 38/18
(52) U.S. Cl. ............... 59/5; 59/8; 59/35.1; 59/78; 474/206; 474/212; 474/217; 384/45; 204/35.1
(58) Field of Search .................. 59/5, 8, 35.1, 78; 474/206, 231, 207, 217, 212; 384/13, 45, 43; 148/326, 325, 319; 204/35.1

(56) References Cited

U.S. PATENT DOCUMENTS

| | | | | | |
|---|---|---|---|---|---|
| 2,995,462 A | * | 8/1961 | Mitchell et al. | ......... | 29/898.12 |
| 4,484,988 A | * | 11/1984 | Robinson | ..................... | 205/187 |
| 4,615,171 A | * | 10/1986 | Burk | .............................. | 59/78 |
| 4,711,676 A | * | 12/1987 | Kitaori et al. | ............... | 148/319 |
| 4,985,092 A | * | 1/1991 | Kaede et al. | ................ | 148/326 |
| 5,412,934 A | * | 5/1995 | Furuyama | ........................ | 59/78 |
| 5,437,148 A | * | 8/1995 | Karp | ............................... | 59/78 |
| 5,803,852 A | * | 9/1998 | Agostinelli et al. | .......... | 474/161 |
| 5,865,021 A | * | 2/1999 | Duerigen et al. | ................. | 59/4 |
| 5,969,934 A | * | 10/1999 | Larsen | ........................ | 361/234 |
| 6,065,278 A | * | 5/2000 | Weber et al. | ................. | 59/78.1 |
| 6,068,568 A | * | 5/2000 | Kozakura et al. | ............... | 59/30 |
| 6,352,366 B1 | * | 3/2002 | Schneeberger et al. | ........ | 384/45 |
| 6,539,699 B2 | * | 4/2003 | Poiret et al. | ..................... | 59/5 |

FOREIGN PATENT DOCUMENTS

| JP | 3122037 | 10/2000 |
|---|---|---|
| JP | 3199225 | 6/2001 |

* cited by examiner

Primary Examiner—David Jones
(74) Attorney, Agent, or Firm—Dann, Dorfman, Herrell and Skillman; Henry H. Skillman

(57) ABSTRACT

A chain which does not generate hydrogen brittleness is formed with components having improved wear resistance. At least one part of the chain, for example a surface, is covered with a diamond-like amorphous carbon coating (DLC). Further, metallic particles are dispersed into the diamond-like amorphous carbon coating.

11 Claims, 6 Drawing Sheets

FIG. 4

| PROTECTIVE FILM | HARDNESS [HV] | FRICTION COEFFICIENT [μ] | FILM TREATMENT TEMPARATURE [°C] | LIMIT OF USE [LIMIT °C] | STRESS [Gpa/μm] |
|---|---|---|---|---|---|
| SINGLE LAYER DLC (EXAMPLE 1) | 5000 | 0.05 | 300 | 400 | 5.0 |
| Me-DLC (EXAMPLE 2) | 1000~2000 | 0.05 | 150~200 | 350 | 0.1~1.5 |
| TiN (COMPARATIVE EXAMPLE 1) | 2500 | 0.44 | 500 | 650 | 0.5 |
| CrN (COMPARATIVE EXAMPLE 2) | 1800 | 0.50 | 350 | 750 | 0.3 |
| CrCN (COMPARATIVE EXAMPLE 3) | 2200 | 0.50 | 350 | 500 | 0.3 |

WEAR RESISTANT CHAIN

FIELD OF THE INVENTION

The present invention relates to chains, which articulate and slide, such as a chain for a power transmission, a chain for a cable guide, a conveyer chain and the like.

BACKGROUND OF THE INVENTION

As a means for improving the wear resistance of a chain, which articulates and slides, the prior art discloses lead plating or nickel plating on the surfaces of the components, which form the chain, forming a hardened layer of a metal carbide or a metal nitride, $MoS_2$ baking treatment, and sulfurizing by FeS (see Japanese patent publications No. 3122037 and 3199225).

When surfaces of a part of a chain have been subjected to lead plating or nickel plating, hydrogen generated in pickling in the preceding step or the plating is absorbed into a metal structure of a part of the chain to generate hydrogen brittleness in the formation of a plated film, and mechanical strength of the part is remarkably reduced.

Further, the hardened layer of metal nitride or metal carbide or the like has further excellent wear resistance as compared with a lead plated layer or a nickel plated layer. However, as the requirement of high speed and high load for chains has recently been increased, a further improvement of wear resistance has been required. Further, the baking treatment or the sulfurizing treatment can be applied only to metallic materials and cannot be applied to plastic chain components, which are required by recent trends.

SUMMARY OF THE INVENTION

Accordingly, the object of the present invention is to provide a wear-resistance-improved wear resistant chain, which does not generate hydrogen brittleness.

To attain this object, a wear resistant chain is characterized in that a surface of at least one of the components forming the chain is provided with a diamond-like amorphous carbon coating.

Further, a wear resistant chain is characterized in that in addition to the configuration of the wear resistant chain, metallic particles are dispersed in the diamond-like amorphous carbon coating.

The chains of the present invention include all chains which articulate and slide, such as a power transmission chain used in an engine or the like, a conveyor chain used in distributing conveyance, a cable guide chain for protecting and guiding a cable, or similar chains. Further, the invention may be applied to chains made of any material such as metal, resin or others. The diamond-like amorphous carbon (DLC) means a carbon coating film having properties similar to diamond, and the carbon coating film is one of a new material of a hard thin film. However, no DLC has been considered for use as a coating film of a chain until now. The present invention has been made by the discovery of the fact that when a diamond-like amorphous carbon, which has not been considered, is used as a coating film material for a chain, excellent wear resistance is obtained.

Thus, when the present invention has the above-described device coating, the following peculiar effects are obtained.

According to the invention, a localized surface area of at least one of components forming a chain which is subject to the greatest wear, is coated with a diamond-like amorphous carbon coating, whereby the generation of hydrogen brittleness is avoided and wear resistance is improved.

According to an additional aspect of the invention, metallic particles are dispersed in the diamond-like amorphous carbon coating. Accordingly, inner stress of the coating is reduced and adhesive power of the coating to the material of a component of a chain is improved. Further, toughness of the coating is improved and a resulting property of the coated component resisting plastic deformation of the material is also improved. Additionally, since the wear resistant chain has a small wear coefficient, the wear resistance of the chain is further improved and at the same time the flexibility of the chain is improved whereby the occurrence of noise and extraneous sound is decreased.

BRIEF DESCRIPTION OF THE DRAWINGS

FIG. 4 is a table showing physical property values of the diamond-like amorphous carbon coatings used in Examples 1 and 2 of the present invention, and comparative prior art examples.

DETAILED DESCRIPTION OF THE DRAWINGS

Figure 1:
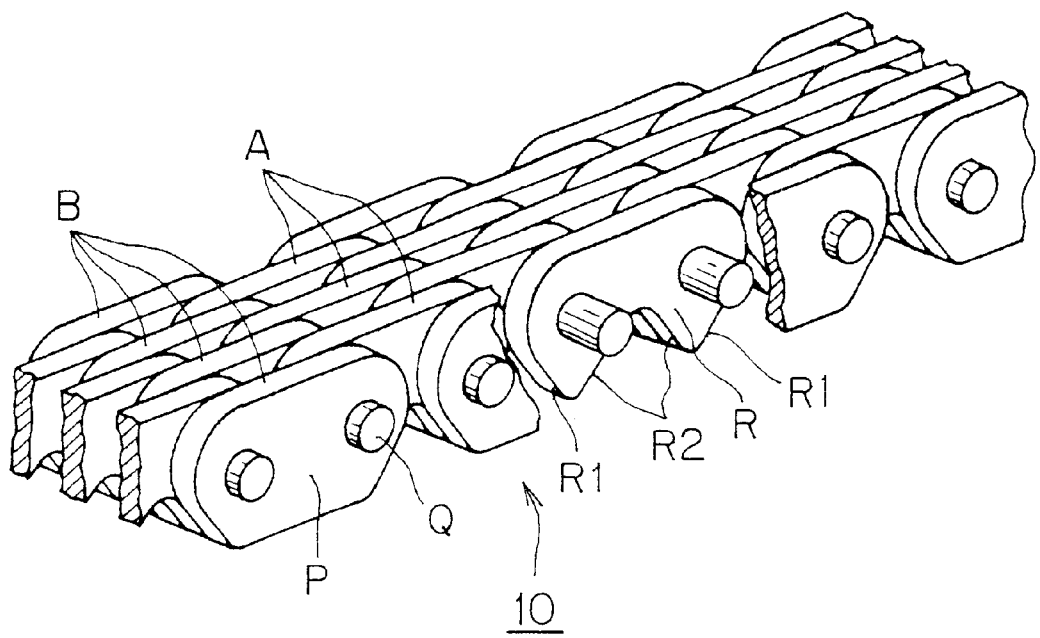
FIG. 1 is a perspective view of a wear resistant chain according to a first embodiment of the present invention.
Figure 2:
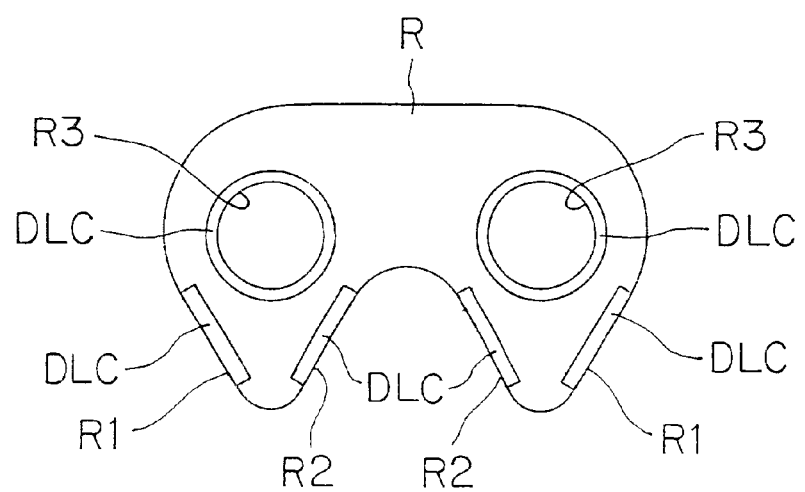
FIG. 2 is a plan view of a plate in the wear resistant chain in FIG. 1.

A first embodiment of the present invention will be described with reference to FIG. 1. FIG. 1 shows the present invention applied to a silent chain 10. The silent chain 10 has three plates R in a joint row A and four plates P in a guide row B. In FIG. 1, the front side two plates are partly cut away so that the internal structure can be understood. The plates R in the joint row A are pivotally supported on the pin Q, and the plates P in the guide row B are attached to the pin Q with their pivoting limited. Each plate R in the joint row A is bifurcated on one-side. The outer flanks of the bifurcated portions comprise two surfaces R1 on both sides which mesh with a sprocket, and the inner flanks of said bifurcated portions comprise two surfaces R2 which also mesh with a sprocket. The surfaces R1 and R2 are localized surface areas which normally are subject to the greatest wear.

Therefore, the plate R in the joint row A has larger wear on the inner surface and meshing surface of the pin hole as compared with the plate P in the guide row. Accordingly, the outside surfaces R1 and the inside surfaces R2 of the bifurcated portions are coated with a diamond-like amorphous carbon coating (DLC).

Figure 3:
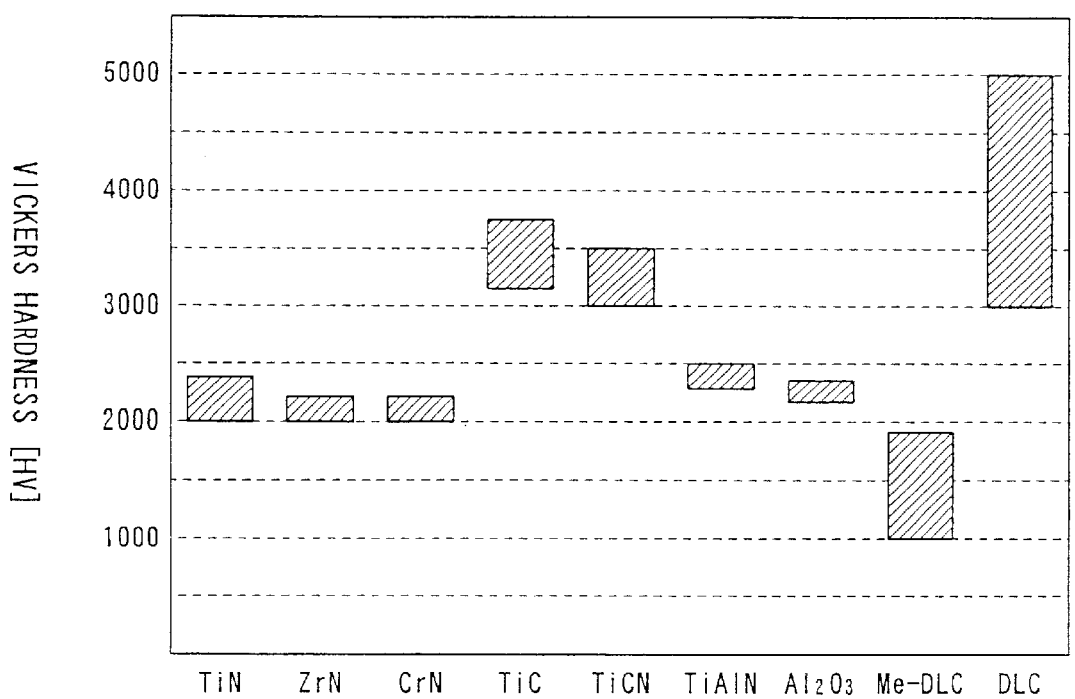
FIG. 3 is a graph showing Vickers hardness of diamond-like amorphous carbon coating used in the present invention in comparison to prior art treatments.

FIG. 3 shows Vickers hardness of diamond-like amorphous carbon coating films used in the present invention together with thereof metal nitrides and metal carbides, which are materials of conventional chain coating films. As apparent from FIG. 3, the diamond-like amorphous carbon coating films have more significant Vickers hardness as compared with that of the metal nitrides and the metal carbides.

FIG. 4 shows the physical property values of a diamond-like amorphous carbon coating (DLC) used in a first example (Example 1) of the present invention and a coating material tungsten-dispersed into a diamond-like amorphous carbon coating used in a second example (Example 2 of FIGS. 3 and 4a) of the present invention (Me-DLC), as well as those of usual metal nitrides (comparative Examples 1, 2 and 3 of FIG. 4). Although the hardness of the tungsten-dispersed DLC film used in the second example is less than that of DLC film used in the first example and is substantially the same as in conventional metal nitrides, the friction coefficient of the tungsten-dispersed DLC film of the second example has an extremely small value that is about 1/10 of that of a conventional metal nitride as in the DLC film of the first example. Further, the tungsten-dispersed DLC film is significantly reduced in inner stress in the coating film compared to that of DLC film and is not liable to be chipped. Thus, the tungsten-dispersed DLC film of the second example is particularly excellent as film materials for a chain to which large surface pressure and shock is applied and a chain used in an environment where there is a large temperature change. It is noted that although, in the second example tungsten is used as the metallic particles dispersed into a diamond-like amorphous carbon coating, other metallic particles as chromium or titanium can also be used.

In the present invention, as a process of forming a diamond-like amorphous carbon coating (DLC) a known DLC film forming process can be used. Concrete processes of forming the DLC film include a high-frequency plasma CVD process using a hydrocarbon gas as an reactive gas, an ion-beam vapor-deposition process in which ions of well-controlled kinetic energy are irradiated onto a substrate in high vacuum atmosphere, and a vacuum arc process or sputtering process in which fine carbon particles are generated from solid carbon by vacuum arc or sputtering. As described above, since the diamond-like amorphous carbon coating in the present invention is formed by the dry processes, it can be applied to resin. Further, when it is applied to metal, hydrogen is not intruded into the metal components of a chain in film forming steps and the hydrogen brittleness is not generated, whereby a reduction in mechanical strength can be prevented.

Figure 5:
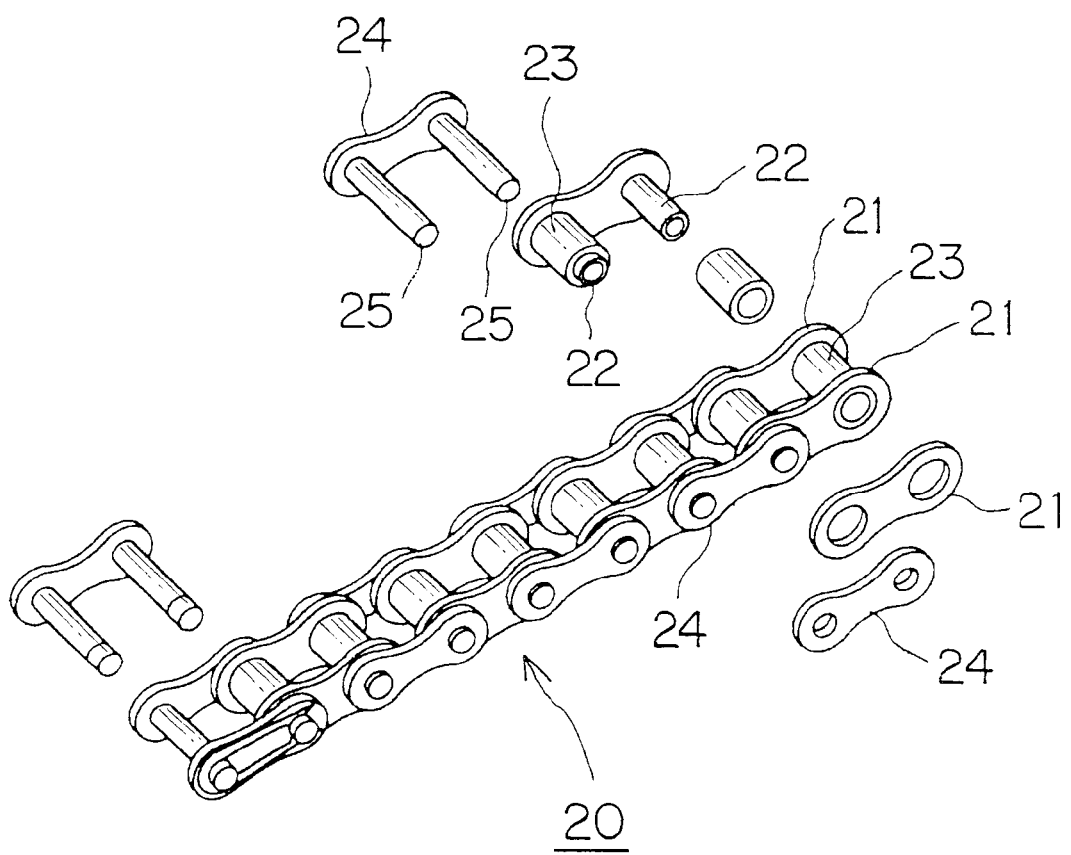
FIG. 5 is a perspective view showing an embodiment in which the present invention was applied to a roller chain.
Figure 6:
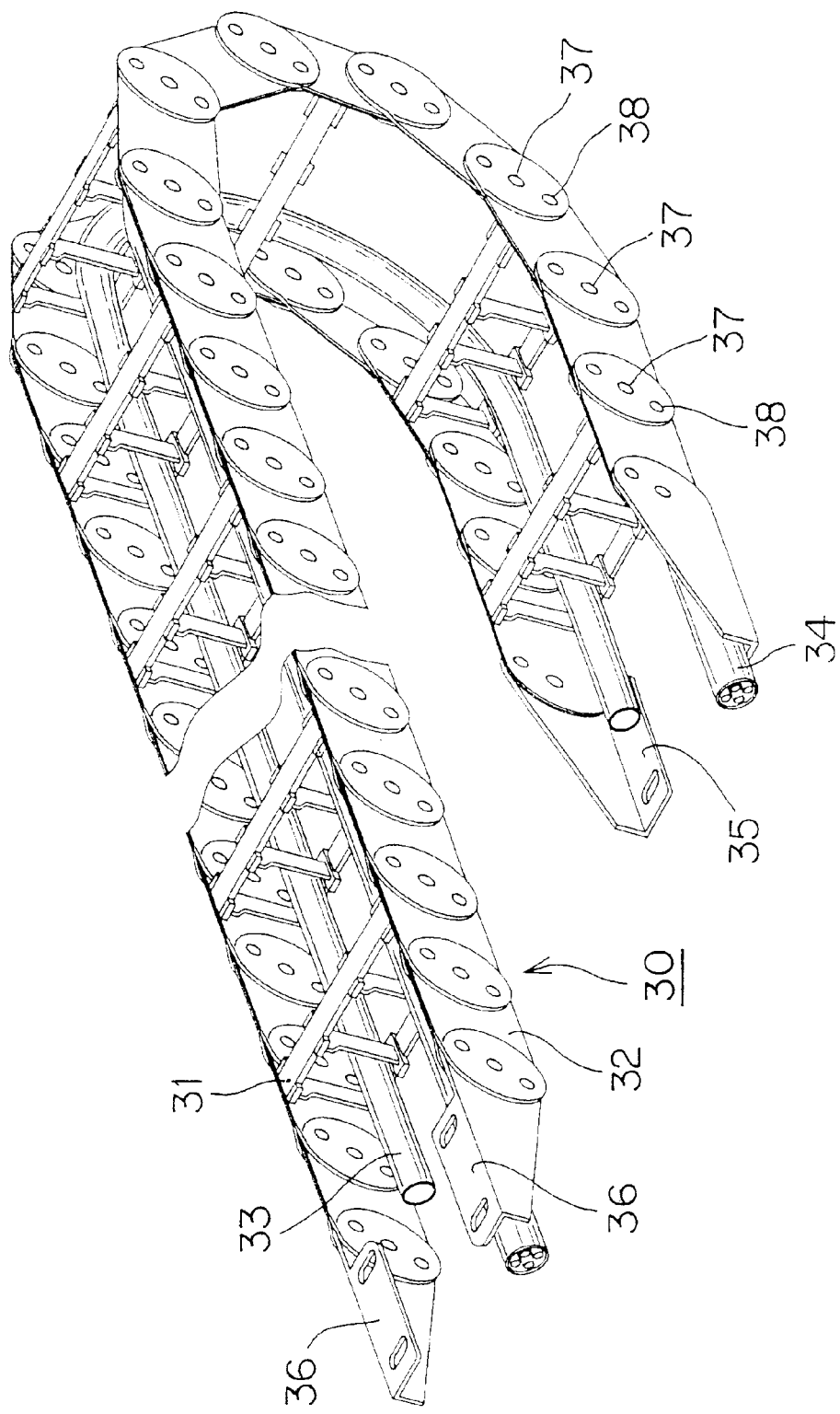
FIG. 6 is a perspective view showing an embodiment in which the present invention was applied to a cable guide chain.
Figure 7:
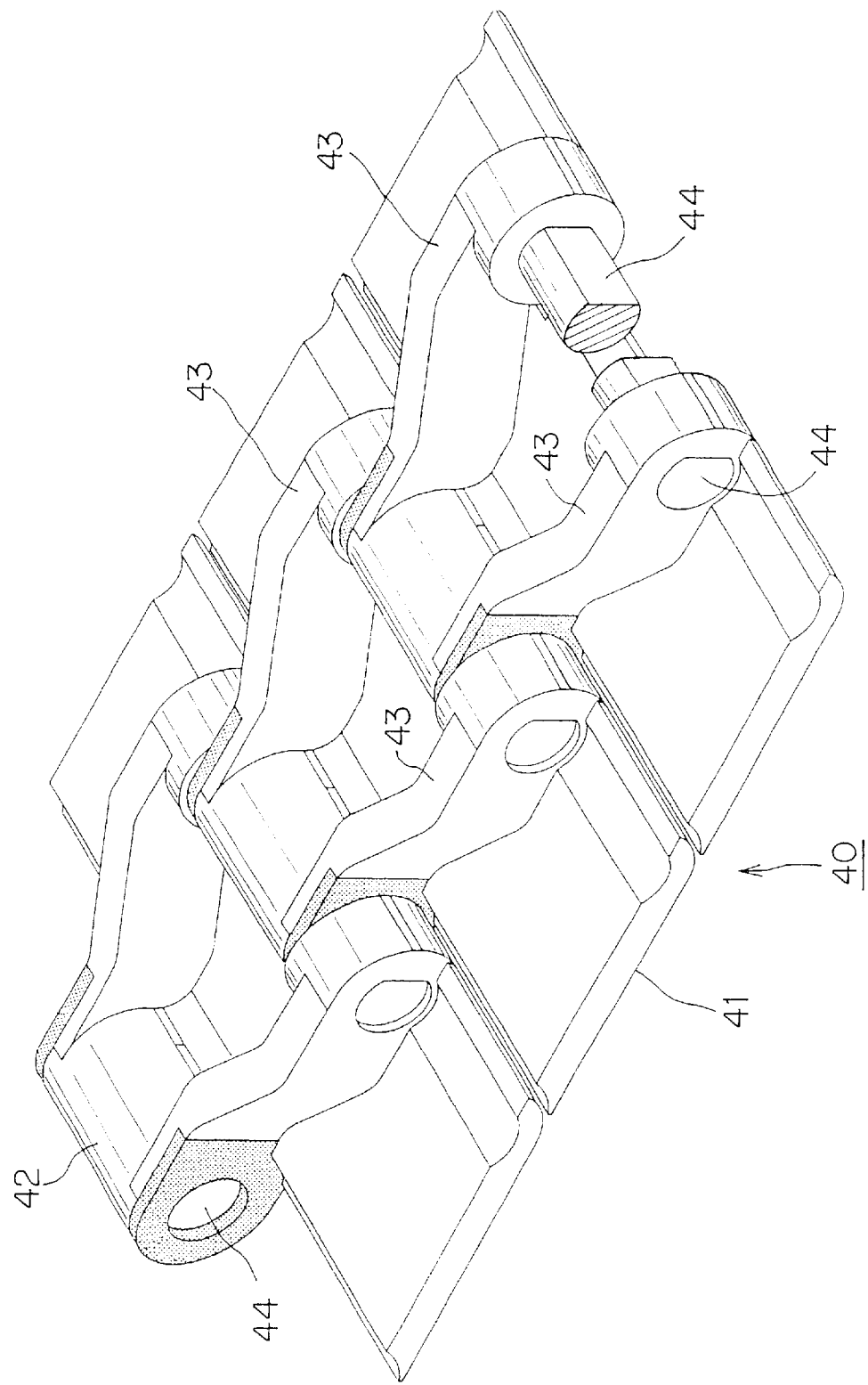
FIG. 7 is a perspective view showing an embodiment in which the present invention was applied to a plastic chain.

FIGS. 5 to 7 show other embodiments of the present invention. Particularly, FIG. 5 shows an embodiment in which a coating of the present invention was applied to a roller chain 20. In this embodiment, the outer surface of a pin 25, which is a sliding surface of the roller chain 20, the inner and outer peripheral surfaces of a bushing 22, the inner and outer peripheral surfaces of a roller 23, and a sliding portion and end surfaces of a plate 24 are subjected to diamond-like amorphous carbon coating (DLC).

FIG. 6 shows an embodiment in which the present invention was applied to a cable guide chain 30, which protects and guides cables. In this embodiment, the sliding surface of a plate 32, and side surfaces of connecting pins 37, which connect between the plates 32, and of pivoting-limiting pins 38 have a diamond-like amorphous carbon coating (DLC).

FIG. 7 shows an embodiment in which the present invention was applied to a plastic chain 40. In this embodiment, the outer peripheral surfaces of pins 44, the outer surfaces of bushings 42, which mesh with a sprocket, the outer surfaces of top plates 41, which are loading surfaces for conveying articles, and inside and outside surfaces of link bodies 43 have a diamond-like amorphous carbon coating (DLC).

In the above-mentioned embodiments the surfaces of components, which form a chain, have a diamond-like amorphous carbon coating (DLC). By also applying a diamond-like amorphous carbon coating (DLC) to the surfaces of a sprocket used together with a chain, the improvement of durability and the suppression of noise and extraneous sound in the entire device in which a chain is used, can be realized.

As described above, the wear resistance chain according to the present invention has the following peculiar effects:

With a wear resistant chain having a coating of Example 1, since a localized surface area of at least one of the components forming a chain which is subject to the greatest wear has a diamond-like amorphous carbon coating, the reduction of mechanical strength due to hydrogen brittleness can be avoided and high wear resistance can be maintained for a long period of time.

A wear resistant chain having a coating of Example 2, in addition to the effect of the wear resistant chain with a coating of Example 1, metallic particles are dispersed in the diamond-like amorphous carbon coating. Accordingly, inner stress of coating is reduced and adhesive power of the coating to the material of a component of a chain is improved. Further, toughness of the coating is improved and a resulting property of the coated component resisting plastic deformation is also improved. Therefore, in an environment in which large surface pressure or impact is applied or in an environment, in which a temperature change is large, wear resistance of a chain can be maintained for a long period of time. Further, since the friction coefficient of the chain becomes small, the wear resistance of the chain is further improved and the flexibility of the chain is also improved, whereby noise and extraneous sound are reduced.

What is claimed is:

1. A wear resistant chain having components which engage other components wherein a surface of at least one of said components is coated with a diamond-like amorphous carbon coating.

2. A wear resistant chain according to claim 1 including metallic particles dispersed in said diamond-like amorphous carbon coating.

3. A wear resistant chain according to claim 2 wherein said metallic particles are tungsten.

4. A wear resistant chain according to claim 2 wherein said metallic particles are chromium.

5. A wear resistant chain according to claim 2 wherein said metallic particles are titanium.

6. A wear resistant chain according to claim 1 wherein said coating is applied to a localized surface of at least one of said components, said localized surface being one which is subject to the greatest wear.

7. A wear resistant chain according to claim 1 wherein said chain has plates with a bifurcated flank operable to engage a sprocket, and said coating is applied to localized surface areas of said flank which are subject to the greatest wear.

8. A wear resistant chain according to claim 7, wherein said plates have pin holes and said coating is applied to inner surfaces of said pin holes.

9. A wear resistant chain according to claim 1 wherein said chain has plates, rollers, bushings and pins, and said coating is applied to localized surface areas of said plates, rollers, bushings and pins which are subject to the greatest wear.

10. A wear resistant chain according to claim 1, wherein said chain has plastic link bodies having loading surfaces, and said coating is applied to said loading surfaces which are subject to the greatest wear.

11. A wear resistant chain according to claim 10, wherein said chain includes a pin and a bushing with an outer surface, wherein said coating is applied to said outer surface of the bushing.

* * * * *